S. WILKINSON.
CAR WHEEL.
APPLICATION FILED MAY 12, 1908.
910,034.
Patented Jan. 19, 1909.
Fig. 1.
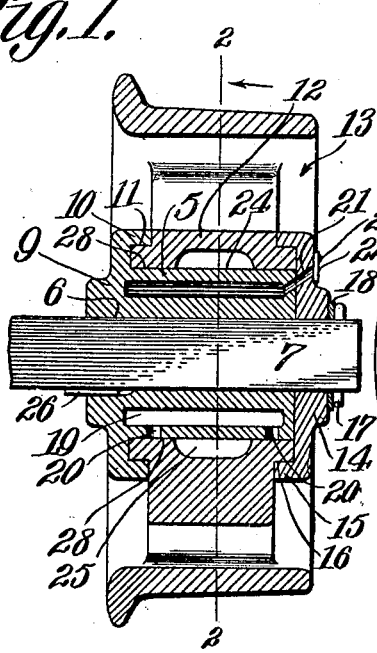
Fig. 2.
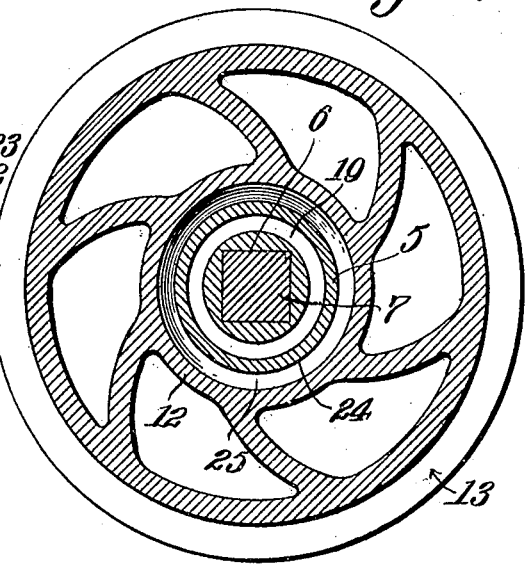
Fig. 3.
Fig. 4.
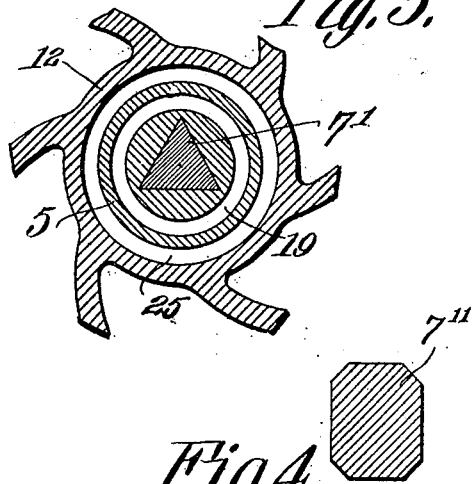
Witnesses
Inventor
Samuel Wilkinson.
By C. A. Snow & Co.
Attorneys

UNITED STATES PATENT OFFICE.

SAMUEL WILKINSON, OF OSCEOLA MILLS, PENNSYLVANIA.

CAR-WHEEL.

No. 910,034.  Specification of Letters Patent.  Patented Jan. 19, 1909.

Application filed May 12, 1908. Serial No. 432,414.

*To all whom it may concern:*

Be it known that I, SAMUEL WILKINSON, a citizen of the United States, residing at Osceola Mills, in the county of Clearfield and State of Pennsylvania, have invented a new and useful Car-Wheel, of which the following is a specification.

This invention relates to traction wheels for mine cars, road wagons, automobiles and other vehicles and has for its object to provide a wheel having a stationary spindle and provided with a bearing sleeve which forms a housing for the spindle and upon which the wheel is journaled thereby to prevent wear on said spindle.

A further object of the invention is to provide a traction wheel, the bearing sleeve of which is provided with an annular oil receiving reservoir for supplying lubricant to the bearing as the wheel revolves, there being an auxiliary reservoir formed in the bore of the wheel and adapted to receive the surplus oil from said bearing.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

In the accompanying drawings forming a part of this specification: Figure 1 is a vertical sectional view of a traction wheel constructed in accordance with my invention. Fig. 2 is a similar view taken on the line 2—2 of Fig. 1 and looking in the direction of the arrow. Fig. 3 is a detail transverse sectional view illustrating a modified form of the invention. Fig. 4 is a transverse sectional view illustrating a further modification.

Similar numerals of reference indicate corresponding parts in all of the figures of the drawings.

The improved traction wheel forming the subject matter of the present invention includes a bearing sleeve 5 having a longitudinal bore 6, the walls of which are preferably rectangular in cross section, as shown, and adapted to receive a correspondingly shaped spindle 7 thereby to prevent rotation of the sleeve with respect to said spindle.

Secured to and preferably formed integral with the inner end of the sleeve 5 is a cap 9 having an inwardly extending flange 10 adapted to engage a seating groove 11 formed in the hub 12 of the wheel proper, indicated at 13.

Slidingly mounted on the spindle 7 is a cap 14 having a similar flange 15, which latter engages a corresponding seating groove 16 formed in the hub 12 at the front of the wheel, as shown. The front cap 14 is secured in position on the spindle 7 by a cotter pin 17, which latter pierces the spindle and bears against a disk or washer 18. Attention is here called to the fact that the grooves 11 and 16 are counter sunk in the face of the hub 12, the depth of said groove being equal to the thickness of the flanges 10 and 15 so that said flanges will be disposed flush with the exterior surface of the hub.

Formed in the sleeve 5 is a circumferential chamber 19 adapted to receive a quantity of oil or other lubricant, the latter being fed to the bearing of the wheel 13 through suitable oil ducts or passages 20. Oil is introduced into the reservoir 19 through alined feed openings 21 formed in the sleeve 5 and cap 14, respectively, said feed openings being normally closed by a plate 22 pivotally mounted at 23 on the cap 14, as best shown in Fig. 1 of the drawings.

The wheel 13 is mounted for rotation on the smooth cylindrical wall 24 of the sleeve and is provided with a circumferential groove 25, which constitutes in effect an auxiliary reservoir and is designed to receive the surplus oil from the bearing and deliver the same on the surface 24 of the sleeve with a splash as the wheel revolves.

By forming the interior bore of the wheel 13 with the groove 25, an auxiliary reservoir is not only produced but the bearing surface of the wheel is materially reduced so as to prevent undue friction between the parts.

A spline or key 26 is preferably formed integral with the spindle 7 for engagement with a correspondingly shaped groove in the cap 9 thereby to assist in preventing rotation of the latter on the spindle.

It will thus be seen that as the wheel 13 revolves oil from the reservoir 19 will be drawn through the feed apertures 20 and deposited on the spaced bearing faces 28 of the wheel, the surplus oil from the bearings 28 being delivered to the auxiliary reservoir 25 and said oil splashed on the bearing surface 24 of the spindle at each revolution of the wheel.

In Fig. 3 of the drawings there is illustrated a modified form of the invention in which the spindle 7' is triangular in cross section, the construction and operation of the device being otherwise similar to that shown in Figs. 1 and 2 of the drawing.

If desired the spindle shown in Figs. 2 and 3 of the drawing may be of the cross sectional configuration, indicated at 7'', in Fig. 6 of the drawings.

While the traction wheel is principally designed for use as a mine car wheel it is obvious that the same may be used with equally good results on automobiles, agricultural machines, traction engines, road wagons, or wherever a wheel of this character is found desirable.

Having thus described the invention what is claimed is:

The combination with an axle having a spindle of polygonal cross section, of a stationary bearing sleeve forming a housing for the spindle, a rear cap provided with an inwardly extending flange over-hanging the bearing surface of the sleeve, a front cap having a similar flange, a wheel journaled on the bearing sleeve and having annular seating grooves formed therein for the reception of the flanges, there being an oil reservoir formed in the sleeve, the walls of which are provided with perforations for feeding lubricant to the exterior surface of the bearing sleeve, there being registering feed openings formed in one of the caps and said sleeve and communicating with the interior of the reservoir, and a closure for the feed opening in said cap.

In testimony that I claim the foregoing as my own, I have hereto affixed my signature in the presence of two witnesses.

SAMUEL WILKINSON.

Witnesses:
JAMES A. WILSEN,
JARED J. WAPLE.